(12) United States Patent
Raygoza

(10) Patent No.: US 8,346,613 B2
(45) Date of Patent: Jan. 1, 2013

(54) ZERO INTEGRATION MODEL FOR E-COMMERCE MERCHANTS

(76) Inventor: Marc Raygoza, Lemoore, CA (US)

( * ) Notice: Subject to any disclaimer, the term of this patent is extended or adjusted under 35 U.S.C. 154(b) by 890 days.

(21) Appl. No.: 11/964,638

(22) Filed: Dec. 26, 2007

(65) Prior Publication Data

US 2009/0171802 A1     Jul. 2, 2009

(51) Int. Cl.
*G06Q 30/00* (2012.01)

(52) U.S. Cl. ............... 705/26.1; 705/26.41; 705/26.61; 705/27.1; 705/37; 705/39; 702/186

(58) Field of Classification Search .............. 705/26.1, 705/27, 37, 39, 26.41, 26.61, 27.1; 345/762; 707/102; 702/186
See application file for complete search history.

(56) References Cited

U.S. PATENT DOCUMENTS

| | | | |
|---|---|---|---|
| 6,892,184 B1 * | 5/2005 | Komem et al. | 705/26.41 |
| 6,996,500 B2 * | 2/2006 | O'Konski et al. | 702/186 |
| 7,013,289 B2 * | 3/2006 | Horn et al. | 705/14.51 |
| 7,107,228 B1 * | 9/2006 | Walker et al. | 705/16 |
| 2002/0054097 A1 * | 5/2002 | Hetherington et al. | 345/762 |
| 2002/0103752 A1 * | 8/2002 | Berger et al. | 705/39 |
| 2003/0033249 A1 | 2/2003 | Ingram et al. | |
| 2003/0069831 A1 * | 4/2003 | Le et al. | 705/37 |
| 2005/0262130 A1 * | 11/2005 | Mohan | 707/102 |

OTHER PUBLICATIONS

International Search Report for related patent PCT/US07/26385 performed by International Searching Authority/US on Sep. 2, 2008.
Written Opinion for related patent PCT/US07/26385 performed by International Searching Authority/US on Sep. 2, 2008.

* cited by examiner

*Primary Examiner* — Yogesh C Garg
(74) *Attorney, Agent, or Firm* — Mintz Levin Cohn Ferris Glovsky and Popeo, P.C.

(57) ABSTRACT

Solutions for e-commerce merchants that allow such merchants to interact with buyers in foreign jurisdictions are disclosed. More specifically, solutions are presented that provide an intermediation service that operates to provide variants of e-commerce (or other) Web sites in a local language of a visitor to such site, such variants including facilities to accept payments for goods or services in the currencies and/or payment forms of the foreign jurisdiction and to provide the e-commerce merchant with required shipment documents to assist in order fulfillment.

10 Claims, 10 Drawing Sheets

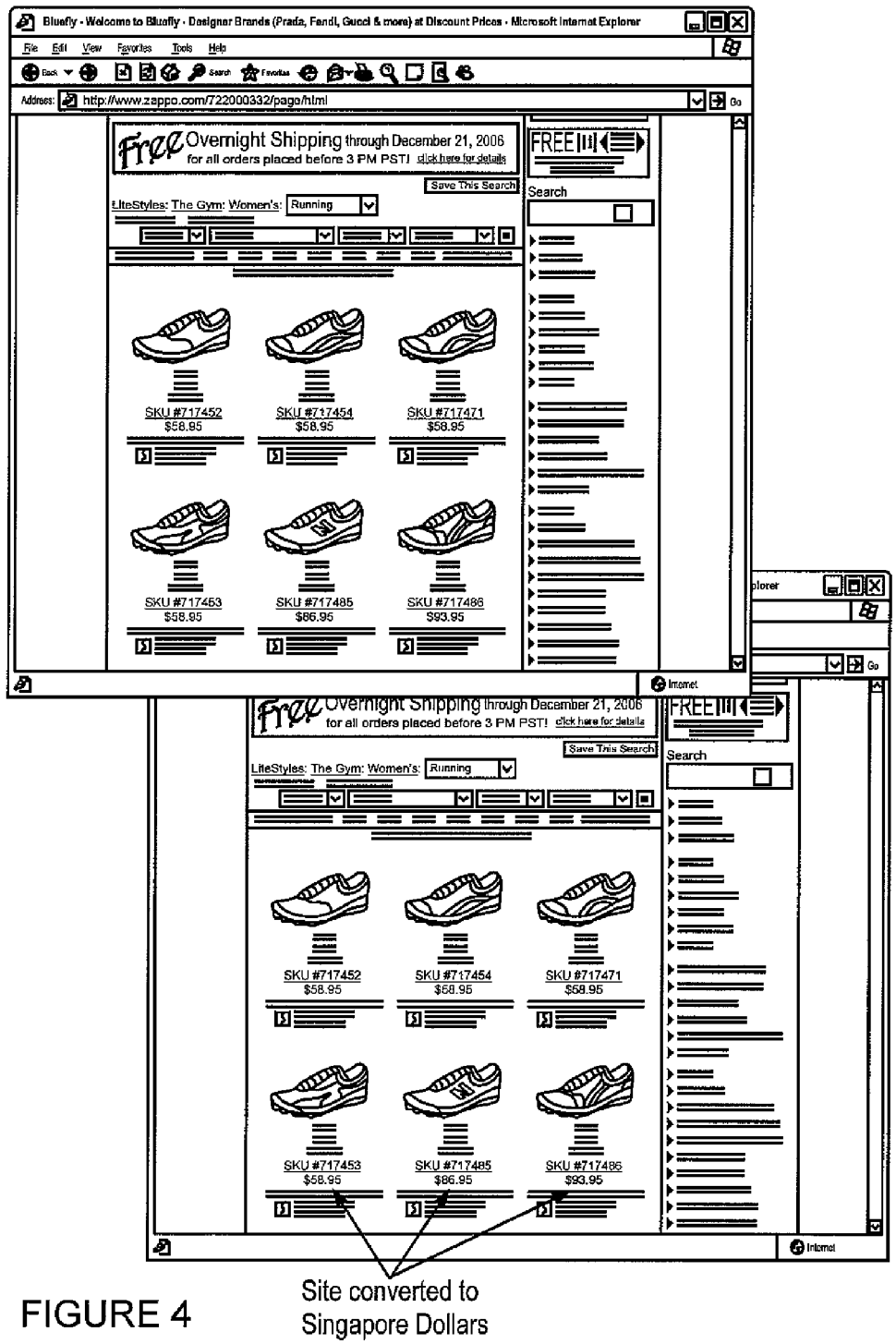
FIGURE 4  Site converted to Singapore Dollars

Additional payment means accepted

FIGURE 8

| Shopping Cart | | | | |
|---|---|---|---|---|
| Item | | Options | Unit Price | Qty. | Cost |
|  Love Glass Coaster Wedding Favors w/ Free Personalized Tags [remove] | Tag Choice : Personalized Tag - Minimum quantity is 24 favors<br>Tag Shape : Circle<br>Tag Color : Blue<br>Tag Design : Baroque | 250.53 (JPY) | 1 | 250.53 (JPY) |
|  "Drama Queen" Crystal Tube Top [remove] | Size : S:Small | 3215.17 (JPY) | 1 | 3215.17 (JPY) |
| | | Update | | |
| | | | Subtotal: | 3465.70 (JPY) |
| | | | U.S. Shipping & Handling | 0.00 (JPY) |
| | | | U.S. Tax | 0.00 (JPY) |
| | | | International Shipping & Handling & Insurance | 12.95 (JPY) |
| | | | Goods & Services Tax (GST) | 242.60 (JPY) |
| | | | Customs Duties | 1.95 (JPY) |
| | | | Total: | 3723.70 (JPY) |

FIGURE 9

| Shipping Information | Billing Information |
|---|---|
| Shipping Address | Billing Address |

*Please note that UPS does not ship to PO Boxes*

Shipping Address:

- First Name: Marc
- Last Name: Raygoza
- Street Address 1: 8548 NE Alderwood
- Street Address 2: Suite 49702
- City: Portland
- State: OR
- Zip Code: 97220
- Phone: (503)-736-5968
- Email Address: mraygoza@gmail.co
- Country: Malaysia ▶

Billing Address:

- ◉ Same as Shipping Address
- ○ Other
- First Name:
- Last Name:
- Street Address 1:
- Street Address 2:
- City:
- State:
- Zip Code:
- Phone:
- Country: United States ▶

FIGURE 10

ZERO INTEGRATION MODEL FOR E-COMMERCE MERCHANTS

CROSS REFERENCE TO RELATED APPLICATIONS

The present application claims priority under 35 U.S.C. §119 to U.S. Provisional Application Ser. No. 60/871,623, filed Dec. 22, 2006, entitled ZERO INTEGRATION MODEL FOR E-COMMERCE MERCHANTS, the disclosure of which is incorporated herein by reference.

BACKGROUND

This disclosure relates generally to solutions for e-commerce merchants that allow such merchants to interact with buyers in foreign jurisdictions. More specifically, a solution provides an intermediation service that operates to provide variants of e-commerce (or other) Web sites in a local language of a visitor to such site, such variants including facilities to accept payments for goods or services in the currencies and/or payment forms of the foreign jurisdiction and to provide the e-commerce merchant with required shipment documents to assist in order fulfillment.

E-commerce Web sites have become ubiquitous. Indeed, sites such as Amazon.com, eBay.com and others are now as popular with shoppers as traditional brick and mortar merchants. Nevertheless, for buyers living outside the United States and perhaps a small number of other developed nations, shopping via the Internet is far from convenient.

One reason for this inconvenience is the fact that many, if not most, e-merchants refuse to ship goods outside of their local jurisdiction. That is, buyers wishing to engage in e-transactions often find that the e-merchant is unwilling to ship to countries other than the one in which the merchant operates. This is true whether the buyer is located in that same jurisdiction or in another jurisdiction. The problem is even farther compounded when the buyer is in another jurisdiction inasmuch as most e-merchants will not accept forms of payment that involve foreign currencies or foreign banks. For example, most U.S. e-merchants will not accept forms of payment involving non-U.S. credit cards or cheques.

Others have recognized business opportunities associated with e-merchants' unwillingness to ship goods to foreign countries. For example, some companies operate as forwarders of such goods, providing the foreign buyer with a U.S. (or other local jurisdiction) address to which goods purchased from a U.S. (or other local jurisdiction) e-merchant can be shipped. Once received at that address, the goods are forwarded on to the actual buyer for a fee. While this somewhat alleviates the problem of dealing with e-merchants that do not offer international delivery, the solution inevitably adds overhead costs (from the buyer's perspective) and (from the forwarder's perspective) really does not scale to accommodate large numbers of foreign buyers. This solution also does not address the problem of the e-merchant refusing to accept payment in foreign currencies or using foreign payment means. Finally, this solution does nothing to enhance the opportunity for sales by the e-merchant inasmuch as the foreign purchaser not only has to bear the increased costs associated with the forwarding of the goods, but must also overcome the need to provide payment in local currencies using a form of local payment means.

SUMMARY

In general, this document discusses a system and method that allows merchants to interact with buyers in foreign jurisdictions. More specifically, the system and method provides an intermediation service that operates to provide variants of e-commerce (or other) Web sites in a local language of a visitor to such site, such variants including facilities to accept payments for goods or services in the currencies and/or payment forms of the foreign jurisdiction and to provide the e-commerce merchant with required shipment documents to assist in order fulfillment.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 4 shows an example of converted prices as compared to those displayed in the original Web page.

FIGS. 7A and B show yet more example Web pages employing an e-commerce toolbar.

FIGS. 8-10 illustrate an International E-Commerce site using the Javascript beacon code.

Like reference symbols in the various drawings indicate like elements.

DETAILED DESCRIPTION

This document describes solutions for e-commerce merchants that allow such merchants to interact with buyers in foreign jurisdictions. More specifically, solutions are presented that provide an intermediation service that operates to provide variants of e-commerce (or other) Web sites in a local language of a visitor to such site, such variants including facilities to accept payments for goods or services in the currencies and/or payment forms of the foreign jurisdiction and to provide the e-commerce merchant with required shipment documents to assist in order fulfillment.

Figure 1:
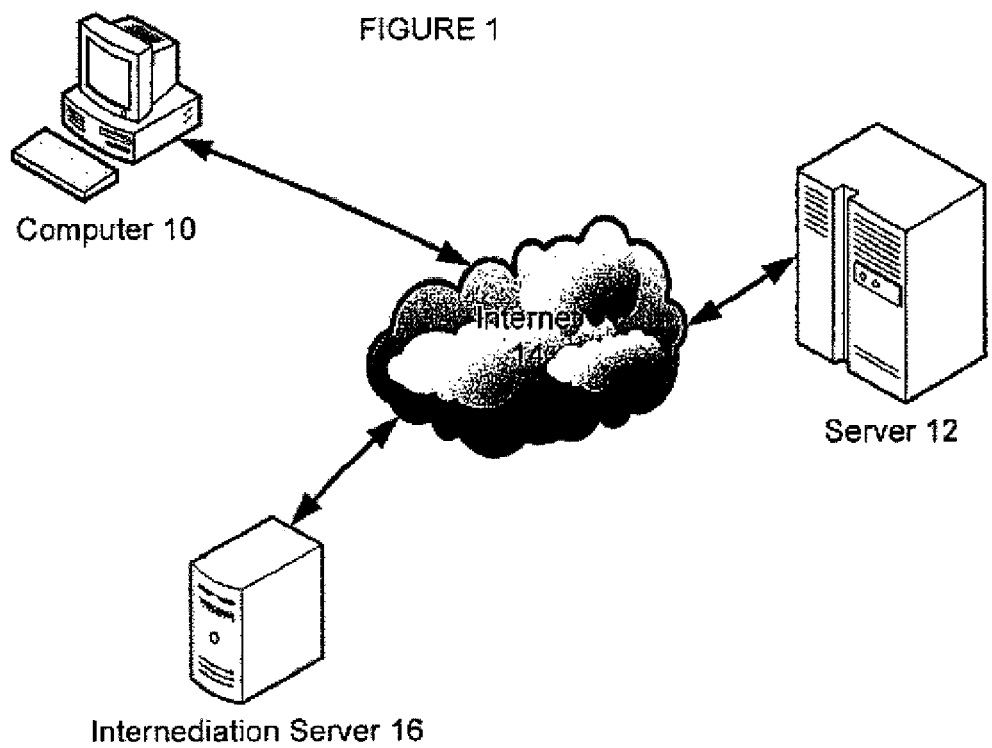
FIG. 1 illustrates an electronic commerce system.

Referring now to FIG. 1, a user operating a personal computer 10 may connect to an e-commerce Web site hosted at a server 12 via the Internet or other computer network 14. Typically, this connection will involve the use of a conventional Internet browser (e.g., Microsoft's Internet Explorer, Apple Computer Inc.'s Safari, etc.) which operates to interpret HTML and other instructions from server 12 to present Web pages to the user at computer 10. Of course, computer 10 may be any type of personal computer, personal digital assistant, mobile phone or other platform on which such a browser operates. Likewise, server 12 may be any form of computer platform.

Unlike conventional Internet browsers, however, the browser running on computer 10 is enhanced with a toolbar configured in accordance with an embodiment of the present invention. Alternatively, if no such toolbar is used (or even if it is), the e-commerce Web site may be enhanced to provide the functionality described herein. For convenience, the remainder of the discussion will assume the use of the toolbar implementation, however, it is important to appreciate that some or all of this functionality may be provided directly by the e-commerce Web site. That is, by modifying an otherwise conventional Web site in accordance with the present teachings, the functionality afforded by the described system and method may be realized.

As will be further discussed below, the toolbar which integrates with the browser running on computer 10 allows intermediation server 16 to take part in transactions between the user and the e-merchant. Certain transactions which appear to the user to take place with the e-merchant Web site will actually take place between computer 10 and the intermediation server 16. Moreover, Web pages and the like which appear to originate with server 12 (i.e., the e-commerce Web site) will, at least in part, originate from the intermediation server 16. In this way the features described below can be provided to the user of computer 10 in a transparent fashion.

Figure 2:
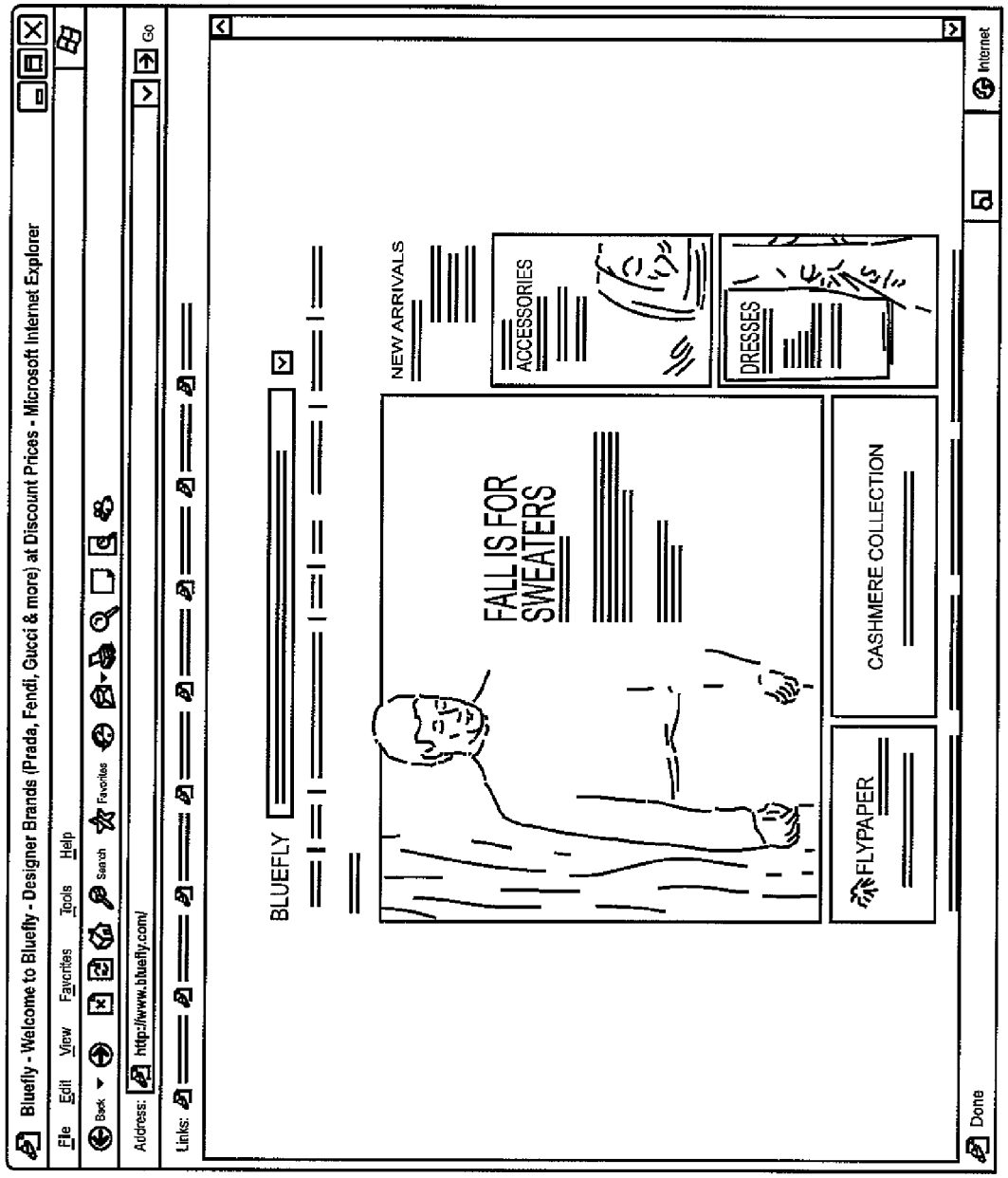
FIG. 2 is an example of a conventional e-commerce Web site.

Referring now to FIG. 2, an example of a conventional e-commerce Web site (as displayed in a conventional browser window) is shown. This may be the Web site of the e-merchant associated with server 12, for example. Various items are presented for sale, though in some cases the sales may not actually be processed by the e-merchant's own transaction engine. That is, it is common in the industry for e-merchants to hand-off transactions to third party service providers at some point during an actual sales transaction that takes place over the Internet. Often, when a user has completed his or her shopping on an e-merchant's site and indicates a desire to "check out" (i.e., pay for his or her selections) the e-merchant will hand off the transaction to a third party to process the shopper's payment. The shopper may or may not be aware of this hand-off.

The hand-off sequence involving payment acceptance and processing can have undesired consequences. For example, if the user does notice the hand-off s/he may be unwilling to complete the purchase inasmuch as it appears to be directed to a different entity (i.e., the payment processor rather than the original e-merchant). This can lead to lost sales for the e-merchant.

Also, because the actual purchase is made with a third party and not the e-merchant, the third party payment processor must now generate an order and pass it to the e-merchant for fulfillment. It is possible that in the time between the user making his/her selections and the time the order is passed from the payment facilitator to the e-merchant the very goods that the user sought to purchase have become unavailable. This can lead to a serious problem inasmuch as the user will have now paid for goods that cannot be delivered.

Figure 3:
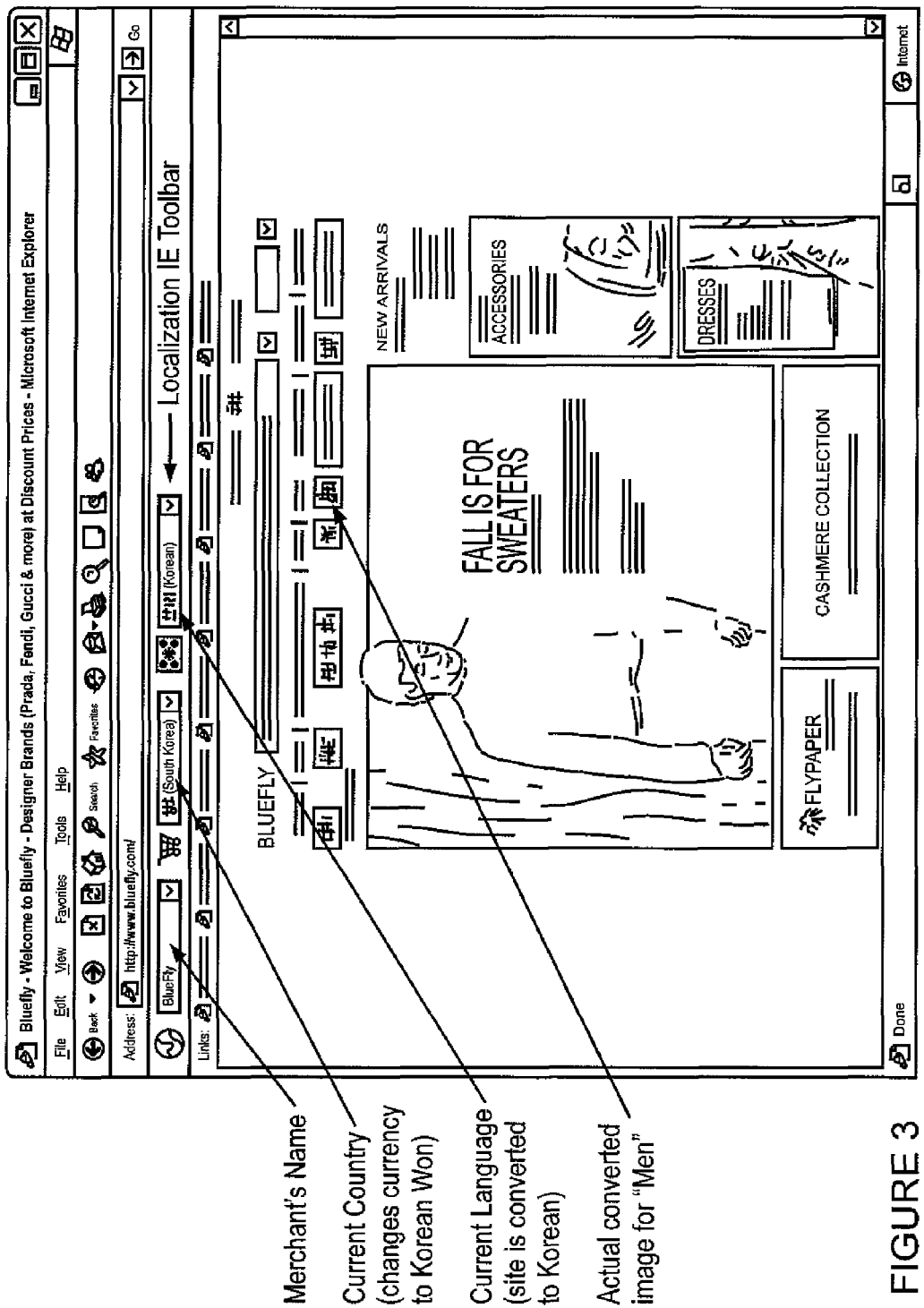
FIG. 3 shows a toolbar which integrates with the browser of a user's computer.

Referring now to FIG. 3, the above-described toolbar which integrates with the browser of the user's computer is shown. In this example, the same Web site that was shown in FIG. 2 is now illustrated in a translated form. This translation was facilitated through the use of the present invention and via the "localization" toolbar for the browser.

The toolbar is the visual display portion of a software application that integrates or plugs-in to the user's browser to provide the functionalities described herein. Using the toolbar the user can view a "localized" representation of an e-merchant's Web site, without the merchant having to create same. That is, by pointing his/her browser to a conventional Web site (say, www.eshop.com) and then selecting his/her current country (say Korea) in the toolbar, the user will be provided with a version of the desired Web site in the language of the country of choice. In FIG. 3 the example is shown for Korea and the text of the original Web site is now displayed in Korean.

This translation of the Web site is facilitated by the intermediation server discussed above. In response to the manipulation of the toolbar to designate the name of the e-merchant Web site being browsed and the country/language of choice, the browser makes a request to the intermediation server to provide a desired, localized version of the Web site (in this example a Korean version). The intermediation server may store a previously produced and localized version of the designated Web site and, upon receiving the request from the browser, deliver that version to the user's computer. This form of delivery is preferred inasmuch as it allows for comprehensive translation of the Web site to account for idiosyncrasies that on-the-fly translations might not account for. Nevertheless, if the desired localized version of the Web site has not yet been produced and stored at the intermediation server, then the intermediation server may perform an on-the-fly translation of the designated Web site and deliver same to the requesting browser. Such translations may be performed at the intermediation server itself or at a different server.

In essence then, by appropriate selection from the toolbar, the user has converted the e-merchant's Web site from its domestic language (English in this example) to desired foreign language (here, Korean). Such conversion is done without the need for the e-merchant to separately create a separate version of the Web site in a different language from that used on the original site.

In one embodiment of the present invention, the entire Web site is not translated. Instead, a dictionary of words and phrases is made available at the intermediation server. In response to user input, the toolbar application associated with the browser parses the currently displayed Web page and extracts key words/phrases. Those words/phrases are then passed to the intermediation server, which returns the translated variants thereof as taken from the dictionary. The browser then renders the Web page exchanging the (English in this example) key words/phrases for the translated (Korean in this example) versions. This dictionary-based approach may be preferred over other embodiments of the invention because it provides a great deal of flexibility for both the e-merchant and the intermediation service provider. For example, e-merchants need not hesitate in making changes to their existing Web sites and the intermediation service provider need not replicate those sites/changes into multiple different versions.

Although the toolbar can provide the above-described features and functions without the e-merchant's involvement, it is preferable if the e-merchant codes his/her Web site in a particular manner. For example, if the e-merchant uses predefined identifiers or other attributes in the HTML elements that make up the Web site, then the parsing operation of the toolbar is made easier. The e-merchant need not insert these attributes into every HTML element, but rather only those elements of the Web page which the e-merchant wishes to have translated.

By way of example, suppose a Web site operator wishes to facilitate translation of portions of his/her e-commerce site from English into Spanish. One such portion might be a button or other Web page element that allows a user to verify his/her identity by logging-in to the site. Commonly, a button or other web element will be labeled log-in to facilitate this type of operation. The HTML code commonly associated with such an element would be:

<INPUT TYPE='SUBMIT' VALUE='Login'>.

In order to facilitate easy translation of this Web element, the e-merchant may modify this expression to read:

<INPUT TYPE='SUBMIT' Id="Login" VALUE='Login'>.

The Id="Login" identified to the toolbar that this is a parameter that should be translated. Hence, when the user operates the toolbar to select Spanish as the language of choice, the resulting button will be displayed as "Conecta" instead of "Login". The intermediation server may be updated periodically to provide translations of many different words phrases into many different languages.

Likewise, the costs of goods displayed on the e-merchant's web site can be converted to equivalent costs in foreign currency. The application associated with the present toolbar may be configured to parse a designated web page for price information and to provide same to the intermediation server along with an indication of the desired currency in which the price information should be displayed. Upon receipt of the price information the intermediation server computes the price of the goods in the designated currency (e.g., by reference to a third party currency conversion Web site or using currency conversion tables maintained at the intermediation server) and returns same to the browser for display in the subject Web page. FIG. 4 shows an example of such converted prices as compared to those displayed in the original Web page. Note, the language of the Web page may or may not be translated from the original, depending on the desired language of choice. That is, currency conversion may be separate from translation.

In addition to facilitating on-the-fly translations into designated languages and currency conversions, the application associated with the present toolbar also provides for altering components of the original Web site to permit, for example, the user to enter foreign addresses and/or foreign payment means. As the user wishes to complete his/her order via the e-merchant's site, the application associated with the present toolbar manipulates the e-merchant's checkout process so it appears that the merchant supports international payment methods, foreign languages and/or currencies.

Figure 5A:
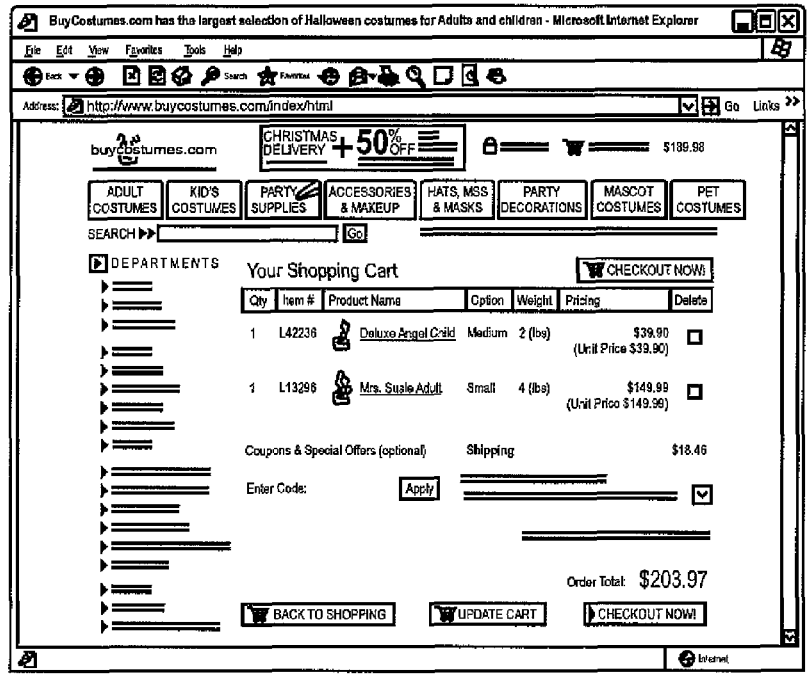
FIGS. 5A and B show example Web pages employing an e-commerce toolbar.
Figure 5B:
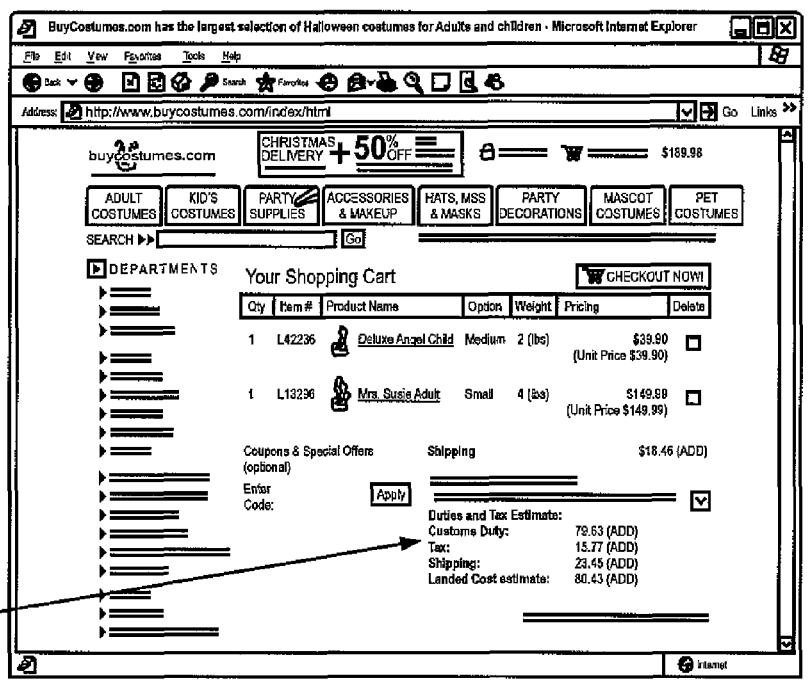

During the checkout process, some or all of the HTML labels, text boxes, submit buttons (and/or other objects) and drop down menus are converted to the user's designated local language. The toolbar also inserts HTML elements that allow the user to submit orders into the domestic Web site and a payment gateway service maintained at the intermediation server so that the intermediation server can accept foreign language characters and process international credit cards or other payment means on behalf of the c-merchant. Compare for example the Web pages illustrated in FIGS. 5A and 5B. The Web page shown in FIG. 5A supports only limited, local jurisdiction payment means. In contrast, the Web page shown in FIG. 5B supports addition payment means. The Web page of FIG. 5B may be provided, at least in part, by the intermediation server in accordance with embodiments of the present invention.

In the event the e-merchant does not support international addresses, for example, the present invention provides for the use of a proxy address for a foreign user. That is, during the checkout process instead of the foreign user submitting a foreign address to the e-merchant the intermediation server instead provides a U.S. (or other local jurisdiction)-based address. This address can be part of a larger, localized proxy profile for the user.

Figure 6A:
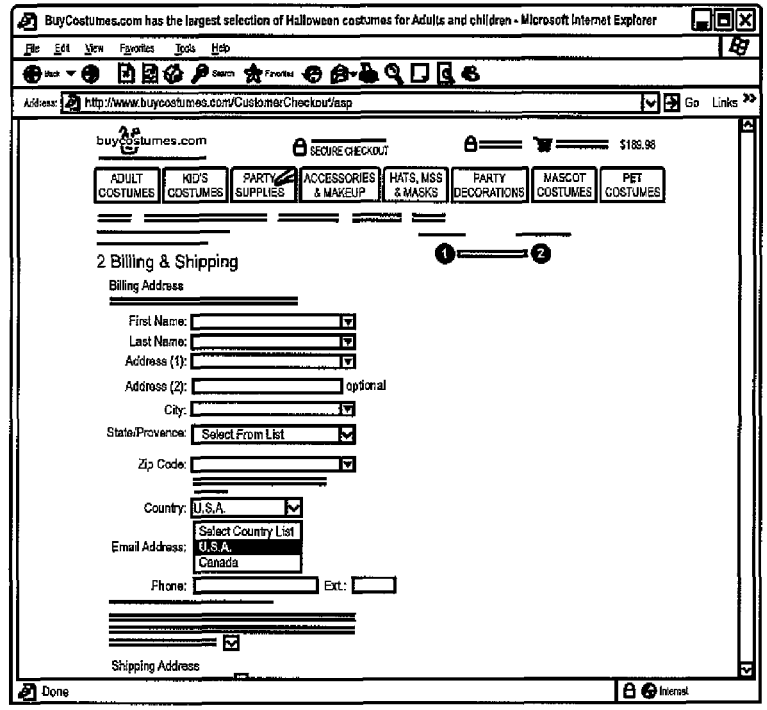
FIGS. 6A and B show yet more example Web pages employing an e-commerce toolbar.
Figure 6B:
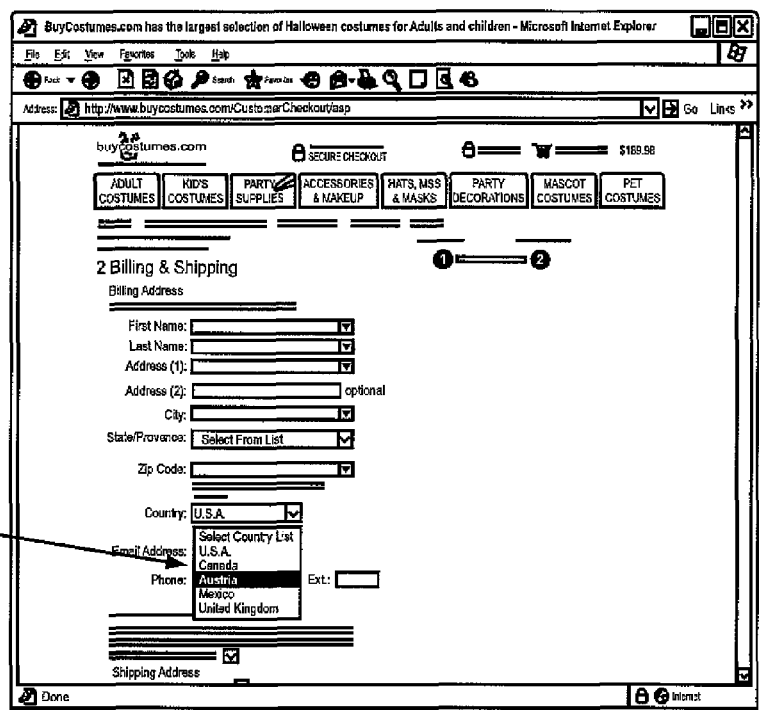

The localized proxy profile is created in response to the foreign user submitting his/her true address and/or payment means to the intermediation server. Of course, the user may not realize this is what is transpiring. The toolbar functionality will have afforded the user the opportunity to input his/her foreign address/payment means information (even if same is not truly supported by the e-merchant) and will have provided same to the intermediation server. Compare for example the Web pages shown in FIGS. 6A and 6B. The Web page shown in FIG. 6A illustrates a convention e-merchant's ordering page, which accepts shipping addresses only from local jurisdictions (or perhaps a very few other jurisdictions). In contrast, the Web page shown in FIG. 6B has been modified so that orders can be placed by people in many different jurisdictions. The intermediation server will store the user's true address information and may also submit the foreign payment means information to the appropriate payment fulfillment agency (e.g., a foreign bank or other source).

In place of the foreign address/payment means information the intermediation server will substitute local jurisdiction address/payment means information in the order form returned to the e-merchant Web site. This local jurisdiction address may be the address of the intermediation service provider or another address. The local jurisdiction payment means may be a local jurisdiction credit card or other payment device agreed upon between the intermediation service provider and the e-merchant. For example, these parties may agree to make use of an escrow account, wire transfer, or bulk purchase order, etc.

Some of the user's actual personal information (for example, name, email address, etc.) may be provided as part of the proxy profile to the e-merchant. This allows the e-merchant to keep an accurate database for marketing purposes, etc. The various international\foreign payment means that are supported by the present invention an include any such payment means that are accepted in the user's home country.

In some cases, order fulfillment will occur with the e-merchant shipping to the address provided in the user's proxy profile. From there, the goods can be forwarded to the user's true address.

A preferred solution, however, eliminates this need for forwarding the goods through a proxy. Specially designated printers at the e-merchant's fulfillment center may be accessed by the intermediation server. The shipping labels and other required documents (e.g., customs declaration forms, etc.) may be printed from the intermediation server to these designated printers. Hence, even though the e-merchant's internal databases may not be configured to accommodate foreign addresses, the intermediation server is so equipped and therefore may provide all of the correct information directly to the printers for completion of the necessary forms. These shipping forms and other materials may be married with the goods to be delivered in the customary fashion and together presented to the e-merchant's shipper for delivery. Inasmuch as virtually all e-merchants use third party shipping companies that accommodate international deliveries, this process will permit the e-merchant to meet international demands for their goods without having to undertake the expense of reconfiguring their own Web sites or fulfillment processes.

One benefit afforded by the present invention is that the order is placed directly into the e-merchant's system, allowing real-time e-mail notifications from the e-merchant directly to the user. Thus, the e-merchant retains the benefit of close customer contact and the user is afforded a straight forward process for international transactions. If the user's e mail is Web-based, the application associated with the toolbar may translate the email into the user's desired local language as it is displayed in the browser (i.e., in much the same fashion as other Web pages may be translated). This real-time information allows the user to cancel the order, if s/he wishes to do so.

The present invention also facilitates translations of search queries entered in the e-merchant's site. For example, when viewing the translated Web page, the fuser may enter a search query in a search box displayed on the translated Web page. This query is passed first to the intermediation server, which translates the query into the language of the e-merchant's site, and then submits the translated query to that e-merchant site. The response from the e-merchant's site may also be translated by the intermediation server (i.e., into the selected language of the user) before being delivered to the user via the browser.

Figures 7A, 7B:
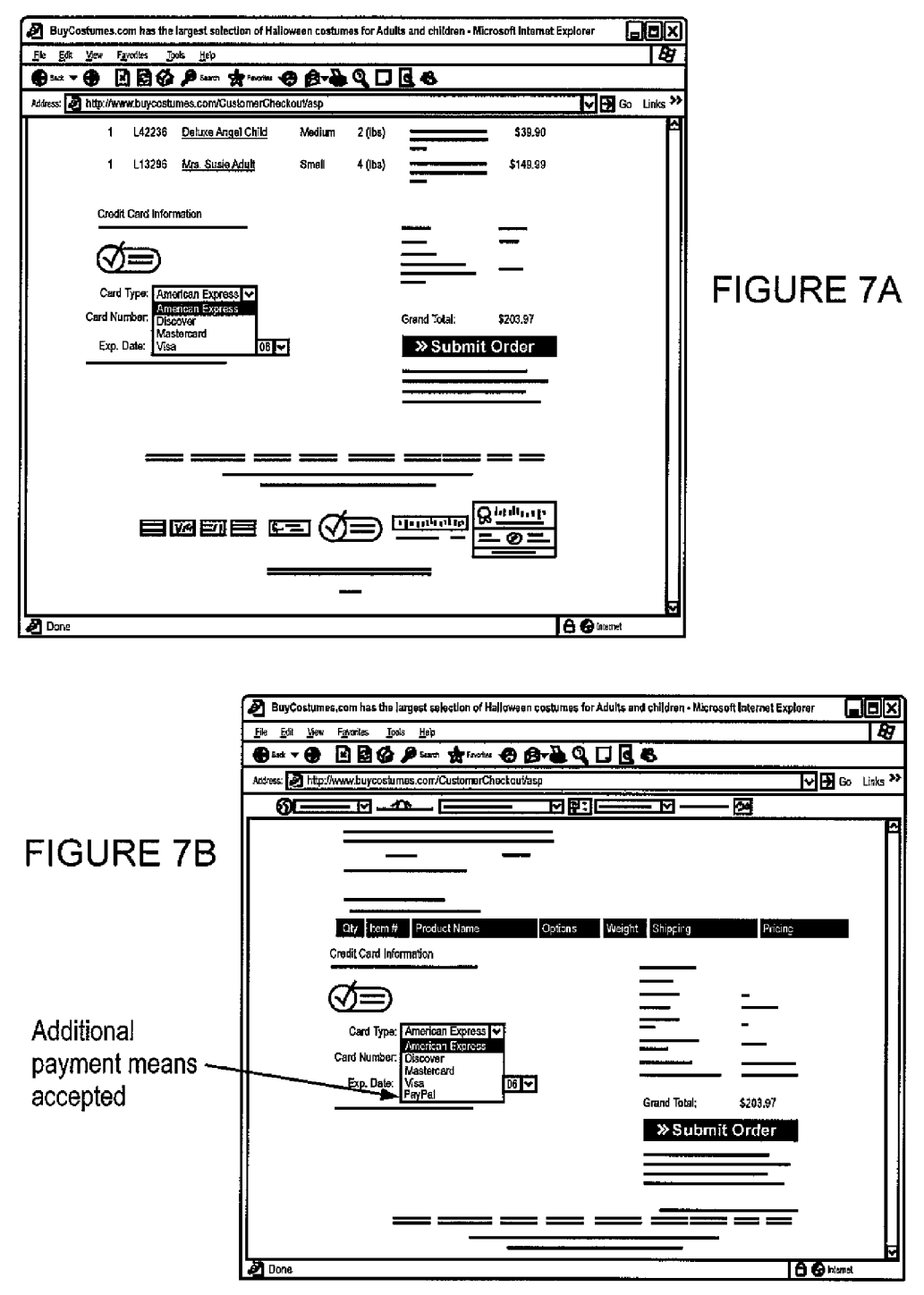

Further examples of the translation/conversion operations facilitated through use of the present invention are illustrated in the accompanying drawings. For example, FIG. 7A shows an example of an e-merchant's web site displaying pricing for a local jurisdiction transaction. FIG. 7B illustrates that same page of the Web site after processing by the intermediation server for presentation to a user in Australia. Not only has the pricing been converted to Australian dollars, taxes and duties associated with an Australian transaction have also been included. Such taxes and duties may be determined from local tax and duty information stored at or access by the intermediation server as part of the currency conversion/translation process. The information concerning the site of the transaction may be derived from information provided by the user (e.g., via the toolbar) or from information obtained by other means (e.g., such as by resolving the IP address associated with the user's computer).

Besides the toolbar integration with the merchant, the same functions as described above can be implemented using "beacon" code that can be inserted into a merchant's Web site's footer. Accordingly, the end user does not need to download the toolbar. The following line of Javascript is a single line of code that exemplifies one implementation of the beacon code that the merchant can embed into their Web site:

<script language="JavaScript" src="http://www.ourdomain.com/Services/lib/beacon.js"type="text/javascript"></script>

Figure 8:
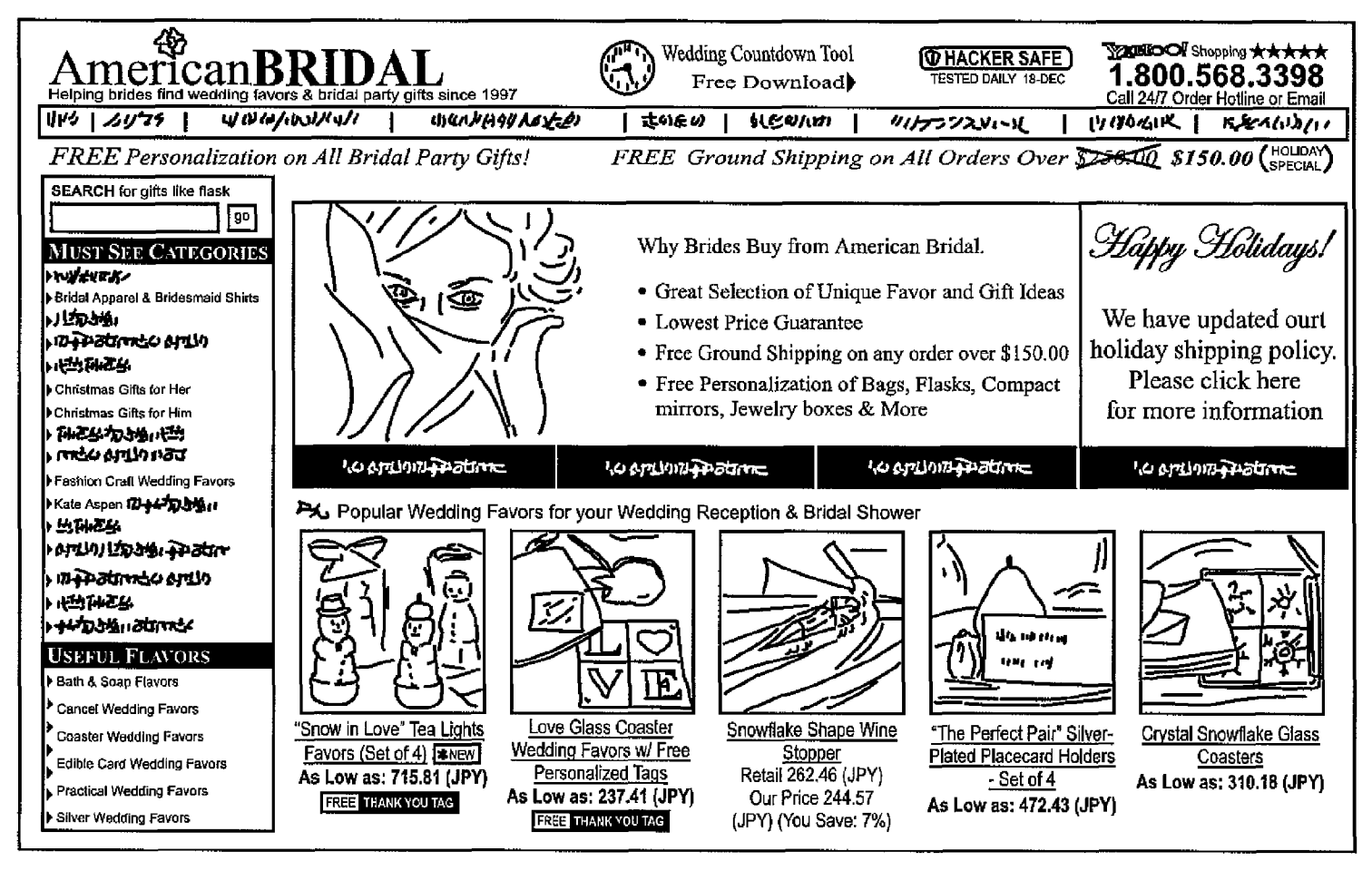

FIGS. 8-10 illustrates an International E-Commerce site using the Javascript beacon code. The beacon code enables:

Web Site Language Localization Including text and images—By embedding the code in a Web site as shown in FIG. 8, language localization from English to Japanese is injected into the Web site in real time. This page also displays conversion converted from U.S Dollar to Japanese Yen.

Currency Conversion.

Embedded Landed Cost Calculator—As shown in FIG. 9, the Landed Cost Calculator provides additional international costs that provide international consumers to make informed buying decisions. The international costs include International Shipping & Handling, International Taxes and Customs Duties costs. These costs are injected into the merchant's shopping cart and are based on the items in the shopping cart.

Inclusion of Foreign Payment Gateways.

Seamless Technical Integration to International Package Forwarders—Since most merchants prefer not to ship packages directly to international consumers, it's imperative to connect the merchants with international package forwarders. To make this process as seamless as possible, the beacon code auto-populates the U.S. consolidation address of the international package forwarder. As shown in FIG. 10, this merchant's shipping form fields were auto-populated with an international package forwarder's U.S consolidation address. The Address 2 field contains the customer's primary unique identifier, which is used to trace the incoming package (s) to the customer's real international address. The beacon supplies incoming advanced shipping notifications to the international package forwarder as the customer completes the order. This occurs seamlessly to both the international customer and merchant.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS)

receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. An electronic commerce system comprising:
a server that hosts a merchant page of a merchant, the merchant page including product information in a first language, and payment information related to one or more products associated with the product information, the payment information being in a first currency associated with the merchant; and
an intermediation server comprising at least one programmable processor connected with the server and a client computer by a network, the intermediation server hosting a localized version of the merchant page and configured to receive address information of a user of the client computer that connects with the merchant page on the server, the intermediation server further configured to receive at least a portion of the merchant page, translate at least some product information of the portion of the merchant page from the first language to a second language associated with the user of the client computer, convert the payment information from the first currency to a second currency associated with the address information of the user, and provide the localized version of the merchant page to the client computer with the product information in the second language and the payment information in the second currency when the client computer is connected with the server to query the merchant page.

2. The system of claim 1, further comprising a code module provided in the footer of the merchant page, the code module including a currency converter to convert the first currency into the second currency.

3. The system of claim 1, wherein the merchant page is further configured to receive destination information from the user of the client computer, and the intermediation server is further configured to calculate a landed cost for an international shipment to a destination based on the destination information.

4. The system of claim 1, wherein the server includes a toolbar generator that generates a toolbar that can be downloaded with the merchant page to the client computer.

5. The system of claim 1, wherein the server is further configured to translate selected text from a first language to a second language, based at least in part on a location associated with the client computer.

6. A method for executing international commerce, the method comprising:
providing, by at least one first programmable processor to a client computer via a network, a web page including product information in a first language and payment information related to one or more products associated with the product information, the payment information being in a first currency associated with the merchant;
hosting, by at least one second programmable processor, a localized version of the web page;
receiving, by the at least one second programmable processor, address information of a user of the client computer;
receiving, by the at least one second programmable processor hosting the localized version of the web page, at least a portion of the web page being served to the client computer;
translating, by the at least one second programmable processor, at least some product information of the portion of the web page from the first language to a second language associated with the user of the client computer;

converting, by the at least one second programmable processor, the payment information from the first currency to a second currency associated with the address information of the user; and providing, by the at least one second programmable processor via the network, the localized version of the web page to the client computer with the product information in the second language and the payment information in the second currency when the client computer is connected with the server to query the web page.

7. The method of claim 6, further comprising:

calculating, by the at least one second programmable processor, a landed cost for international shipment of a purchased product; and displaying, by the at least one second programmable processor, the landed cost on a page with the second currency.

8. The method of claim 7, further comprising automatically generating, by the at least one second programmable processor, processor, an international package forwarder request.

9. The method of claim 8, further comprising transmitting, by the at least one second programmable processor, the international package forwarder request to a selected international package forwarder.

10. The method of claim 9, further comprising tracking, by the at least one second programmable processor, a shipment of the purchased product.

\* \* \* \* \*